US012679243B2

(12) United States Patent
Kwon et al.

(10) Patent No.: US 12,679,243 B2
(45) Date of Patent: Jul. 14, 2026

(54) ELECTRIC VEHICLE AND POWER MANAGEMENT METHOD OF SAME

(71) Applicants:Hyundai Motor Company, Seoul (KR); Kia Corporation, Seoul (KR)

(72) Inventors: Gi Young Kwon, Seoul (KR); Won Jae Lee, Suwon-si (KR); Min Su Kim, Hwaseong-si (KR); Dong Hwan Kwak, Hwaseong-si (KR); Jong Hyeok Park, Hwaseong-si (KR); Sang Hyeon Oh, Seoul (KR); Dae Won Yang, Seongnam-si (KR); Jae Woo Jeon, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 757 days.

(21) Appl. No.: 18/159,870

(22) Filed: Jan. 26, 2023

(65) Prior Publication Data

US 2024/0059183 A1    Feb. 22, 2024

(30) Foreign Application Priority Data

Aug. 17, 2022    (KR) .......................... 1020220102840

(51) Int. Cl.
B60L 58/15 (2019.01)
B60L 58/18 (2019.01)
*B60L 53/80* (2019.01)

(52) U.S. Cl.
CPC ............... B60L 58/15 (2019.02); B60L 58/18 (2019.02); *B60L 53/80* (2019.02); *B60L 2240/547* (2013.01)

(58) Field of Classification Search
CPC ........... B60L 58/15; B60L 58/18; B60L 53/80
USPC ......................................................... 320/109
See application file for complete search history.

(56) References Cited

U.S. PATENT DOCUMENTS

| | | | | |
|---|---|---|---|---|
| 8,855,840 B2 * | 10/2014 | Fleming | ................. | G16Z 99/00 |
| | | | | 701/22 |
| 10,150,460 B2 | 12/2018 | Slosarczyk et al. | | |
| 10,464,431 B2 * | 11/2019 | Ger | ......................... | B60L 50/66 |
| 2020/0171973 A1 * | 6/2020 | Perkins | ................. | B60L 53/14 |

FOREIGN PATENT DOCUMENTS

| | | |
|---|---|---|
| JP | 2020167879 A | 10/2020 |
| KR | 102044276 B1 | 11/2019 |
| KR | 20200004650 A | 1/2020 |
| KR | 20200075098 A | 6/2020 |
| KR | 20220011966 A | 2/2022 |

* cited by examiner

*Primary Examiner* — Nathaniel R Pelton
(74) *Attorney, Agent, or Firm* — Fish & Richardson P.C.

(57) ABSTRACT

A power management method of an electronic vehicle includes performing charging of a main battery through discharging of a swap battery, determining charge and discharge powers of the main battery during the charging of the main battery, and limiting a maximum discharge power of the main battery when the charge power is smaller than the discharge power.

16 Claims, 5 Drawing Sheets

Battery power (kw)

Maximum discharge
power of main battery(kw)

Charge power of
swap battery(kw)

Time

Main battery SOC

Time

Battery power (kw)

Difference between discharge
power and charge power

Maximum discharge
power of main battery(kw)

Limited maximum discharge
power of main battery(kw)

Charge power of
swap battery(kw)

Time

Main battery SOC

Time

1

ELECTRIC VEHICLE AND POWER MANAGEMENT METHOD OF SAME

CROSS REFERENCE TO RELATED APPLICATION

The present application claims priority to Korean Patent Application No. 10-2022-0102840, filed on Aug. 17, 2022, the entire contents of which are incorporated herein for all purposes by this reference.

TECHNICAL FIELD

The present disclosure relates to an electric vehicle and a power management method of the same, in which with a main battery and a swap battery being mounted to the electric vehicle, the SOC (state of charge) of the main battery is prevented from decreasing when charging the main battery with the energy of the swap battery while the electric vehicle is operating.

BACKGROUND

Recently, with increasing interest in the environment, electric vehicles equipped with an electric motor as a power source are increasing.

Even though a significant number of users of an electric vehicle have a driving pattern centered on short-distance downtown, the electric vehicle has a relatively long battery charging time compared to the refueling time of an internal combustion engine vehicle, so the maximum driving distance of the electric vehicle through one full charge is important.

However, when the battery capacity to increase the driving distance of the electric vehicle is increased, the weight of the electric vehicle increases, and the price of the electric vehicle increases significantly since the price of a battery takes up a large portion of the price of the electric vehicle. In addition, due to the increased battery capacity, it takes a long time to fully charge the battery.

In order to solve the problems of reduced mileage and charging time due to battery deterioration, the battery is provided to be detachable. In the case of small mobility such as electric scooters, a low-voltage/low-capacity battery can be applied thereto and a user can exchange the battery directly, but it is difficult for a user to directly replace a Large-capacity battery for a vehicle due to weight and safety issues, so a dedicated infrastructure is required. However, to expand the infrastructure for battery replacement, it is necessary to secure a site and replacement equipment at a large cost, and even if the infrastructure is in place, driving itself is difficult when there is physical damage to a fastening part or damage to a contact by a fire as the number of batteries replaced increases.

Meanwhile, when in addition to a main battery, a removable swap battery is provided, the main battery may be charged by using the swap battery, and this may be performed even while the vehicle is driving. However, when the main battery is charged with the energy of the swap battery according to the output level of the main battery occurring when the vehicle is driving, the SOC of the main battery is not increased.

SUMMARY

In order to achieve the above objectives, according to one aspect of the present disclosure, there is provided a power management method of an electric vehicle, the method including: performing charging of a main battery through discharging of a swap battery; determining charge and discharge powers of the main battery during the charging of the main battery; and limiting a maximum discharge power of the main battery when the charge power is smaller than the discharge power.

For example, the performing of the charging of the main battery may include monitoring a maximum depth-of-discharge (DOD) information of the swap battery or a maximum state-of-charge (SOC) information of the main battery, the maximum SOC information being received from the swap battery.

For example, the information may include at least one of an output power, an output current, and an output voltage output by the swap battery, or at least one of an input power, an input current, and an input voltage input to the main battery.

For example, the determining may include determining an average charge power obtained by dividing an integrated charge energy by a reference period of time as the charge power after integrating a charge energy charged in the main battery for the reference period of time during the charging of the main battery.

For example, the determining may include determining an average discharge power obtained by dividing an integrated discharge energy by a reference period of time as the discharge power after integrating a discharge energy of the main battery for the reference period of time.

For example, the determining of the average discharge power as the discharge power may consider a rated power of the main battery according to unit time when integrating the discharge energy of the main battery.

For example, the limiting of the maximum discharge power of the main battery may include decreasing the maximum discharge power of the main battery by difference between the discharge power and the charge power when the charge power is smaller than the discharge power.

For example, the limiting of the maximum discharge power of the main battery may include decreasing the maximum discharge power of the main battery by difference between the discharge power and the charge power when a current state of charge (SOC) of the main battery is lower than a minimum state of charge (SOC) thereof after determining whether the current SOC of the main battery is lower than the minimum SOC when the charge power is smaller than the discharge power.

For example, the limiting of the maximum discharge power of the main battery may further include maintaining the maximum discharge power of the main battery when the charge power is larger than the discharge power, or when the charge power is smaller than the discharge power and the current SOC of the main battery is higher than the minimum SOC.

In addition, to achieve the above objectives, the electric vehicle according to the present disclosure includes: a main battery and a swap battery; and a charge/discharge management controller which performs charging of the main battery through discharging of the swap battery, determines charge and discharge powers of the main battery during the charging of the main battery, and limits a maximum discharge power of the main battery when the charge power is smaller than the discharge power.

For example, the charge/discharge management controller may monitor a maximum depth-of-discharge (DOD) information of the swap battery or a maximum state-of-charge (SOC) information of the main battery, the maximum SOC information being received from the swap battery.

For example, the information may include at least one of an output power, an output current, and an output voltage output by the swap battery, or at least one of an input power, an input current, and an input voltage input to the main battery.

For example, the charge/discharge management controller may integrate a charge energy charged in the main battery for a reference period of time during the charging of the main battery, and may determine an average charge power obtained by dividing an integrated charge energy by the reference period of time as the charge power.

For example, the charge/discharge management controller may integrate a discharge energy of the main battery for a reference period of time, and may determine an average discharge power obtained by dividing an integrated discharge energy by the reference period of time as the discharge power.

For example, the charge/discharge management controller may consider a rated power of the main battery according to unit time when integrating the discharge energy of the main battery.

For example, the charge/discharge management controller may decrease the maximum discharge power of the main battery by difference between the discharge power and the charge power when the charge power is smaller than the discharge power.

For example, the charge/discharge management controller may determine whether a current state of charge (SOC) of the main battery is lower than a minimum state of charge (SOC) of the main battery when the charge power is smaller than the discharge power, and may decrease the maximum discharge power of the main battery by difference between the discharge power and the charge power when the current SOC of the main battery is lower than the minimum SOC of the main battery.

For example, the charge/discharge management controller may maintain the maximum discharge power of the main battery when the charge power is larger than the discharge power or when the charge power is smaller than the discharge power and the current SOC of the main battery is higher than the minimum SOC.

According to the electric vehicle and the power management method of the same of the present disclosure, when charging the main battery with the energy of the swap battery, the charge power and discharge power of the main battery are determined, and when the charge power is less than the discharge power, the maximum discharge power of the main battery is limited, thereby preventing the decrease of the SOC of the main battery even when charging the main battery while the vehicle is driving.

Effects obtained from the present disclosure are not limited to effects described above, and other effects not described above will be clearly appreciated from the following description by those skilled in the art.

DETAILED DESCRIPTION

First, the components of an example of an electric vehicle will be described with reference to FIG. 1.

Figure 1:
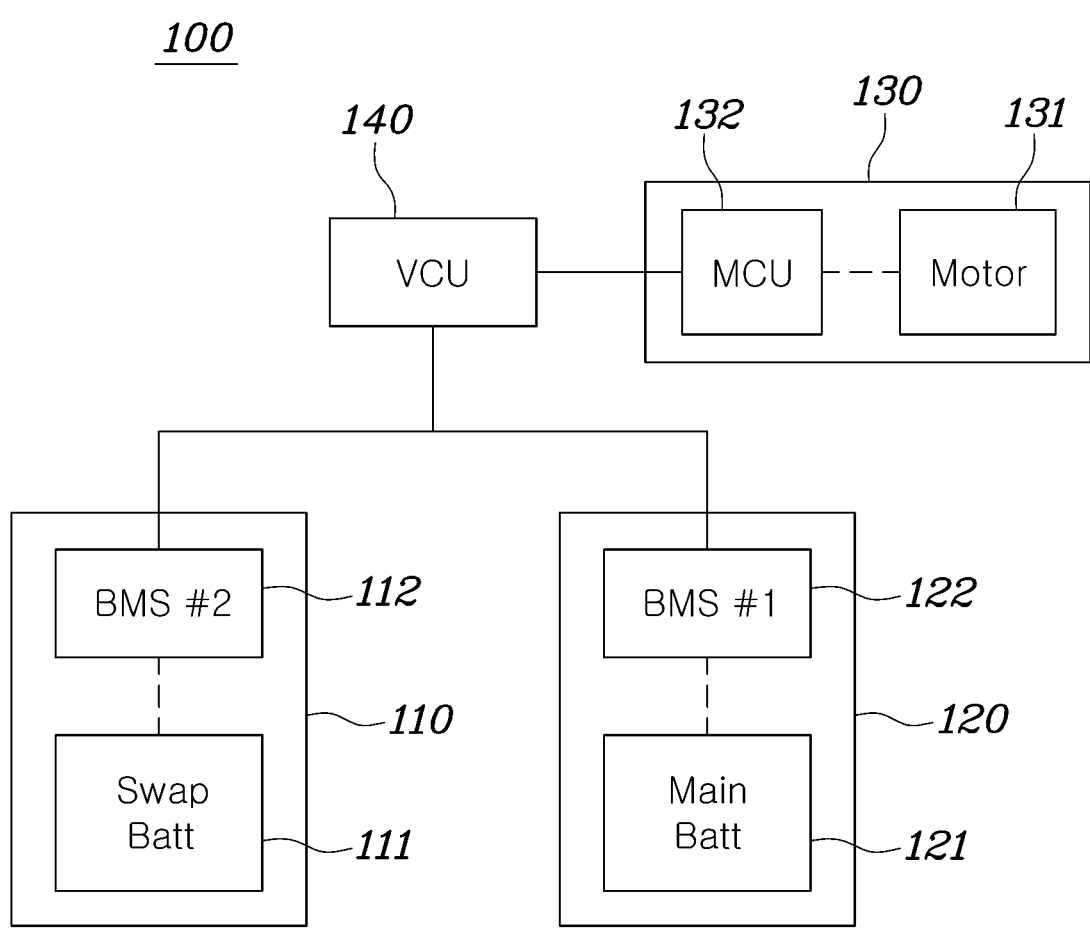
FIG. 1 is a block diagram illustrating an example of an electric vehicle equipped with a removable swap battery.

FIG. 1 is a block diagram illustrating an example of the electric vehicle equipped with a removable swap battery.

Referring to FIG. 1, the electric vehicle 100 may include a swap battery part 110, a main battery part 120, a power drive part 130, a vehicle control unit 140, and an output device 150.

Hereinafter, each component of the electric vehicle 100 will be described.

The swap battery part 110 may include the swap battery 111 and a second battery management system (BMS) 112. The second battery management system 112 may manage the voltage, current, temperature, state of charge (SOC), and state of health (SOH) of the swap battery 111, and may control the charging/discharging of the swap battery 111. In addition, the second battery management system 112 may preset and manage the upper and lower limits for the SOC of the swap battery 111, and may store the cell type information and rated capacity information of the swap battery 111. Furthermore, the second battery management system 112 may transmit information about the swap battery 111 to the outside through a predetermined vehicle communication protocol (for example, a controller area network (CAN)), and may receive a command for charging/discharging the swap battery 111.

In some implementations, the swap battery part 110 may be provided with a cooling device for cooling the swap battery 111, for example, an air cooling fan, and in this case, the second battery management system 112 may control the operation state of the fan according to the state of the swap battery 111 or the speed of the vehicle. Of course, the swap battery part 110 may be cooled in a natural cooling method, or may be cooled by water cooling by disposing a cooling pad, through which a coolant circulates, in a portion of the vehicle to which the swap battery part 110 is mounted.

Meanwhile, the swap battery part 110 may be mounted on the roof of the electric vehicle 100 or accommodated in a space in a trunk or under the vehicle, and may be connected to the vehicle in the form of a trailer by having a separate wheel, but this is exemplary and is not limited thereto.

As illustrated in the drawing, the main battery part 120 may include the main battery 121 and a first battery management system 122, and may be installed by being fixed to the vehicle. The first battery management system 122 may manage the voltage, current, temperature, state of charge (SOC), and state of health (SOH) of the main battery 121, and may control the charging/discharging of the main battery 121.

The power drive part 130 may include a motor 131 and a motor control unit (MCU) 132 which controls the motor 131.

The vehicle control unit 140 may determine a required driving force according to the value of an accelerator pedal position sensor (APS), and may determine a required braking force according to the value of a brake pedal position sensor (BPS). The vehicle control unit 140 determines a driving torque or regenerative braking torque to be output by the motor 131 of the power drive part 130 according to the required driving force or the required braking force, and may transmit a torque command according to the driving torque or regenerative braking torque to the motor control unit 132 or an inverter. In addition, the vehicle control unit 140 may transmit a charge or discharge command for the main battery 121 or the swap battery 111 to an associated system of the first battery management system 122 and the second battery management system 112 according to a driving situation, and the state of the main battery 121 and the swap battery 111.

In some implementations, in order to prevent the decrease of the SOC of the main battery 121 when charging the main battery 121 with the energy of the swap battery 111 while the electric vehicle 100 is driving, it is suggested to limit the DOD (depth of discharge) of the main battery 121 according to a situation. A principle for this will be described with reference to FIGS. 2 and 3.

Figure 2:
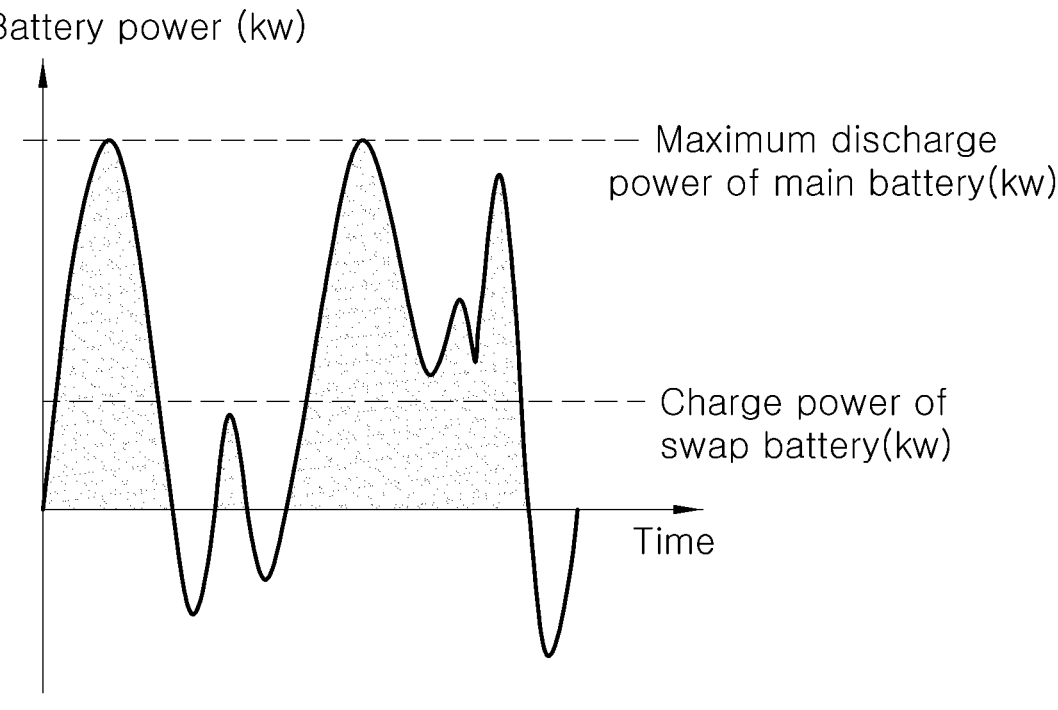
FIGS. 2 and 3 are graphs illustrating an example of the principle of limiting the output of the main battery.
Figure 2:
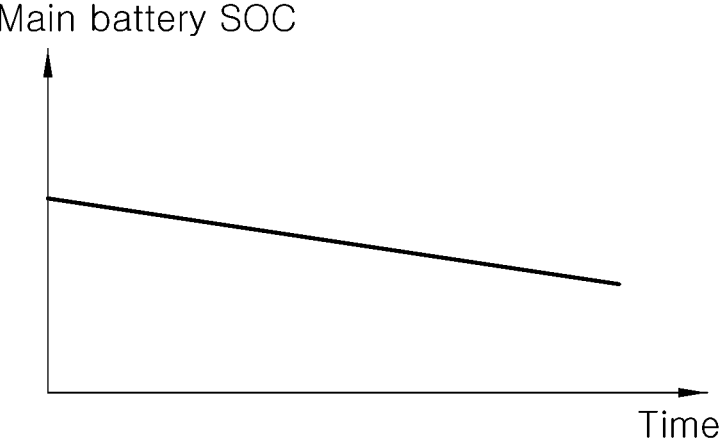
Figure 3:
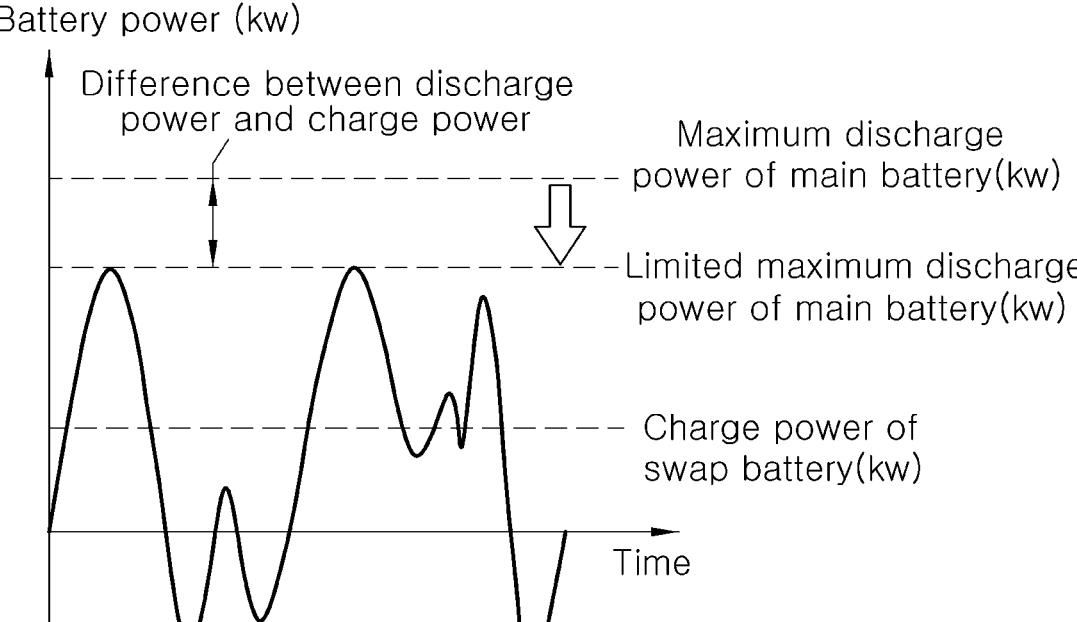
Figure 3:
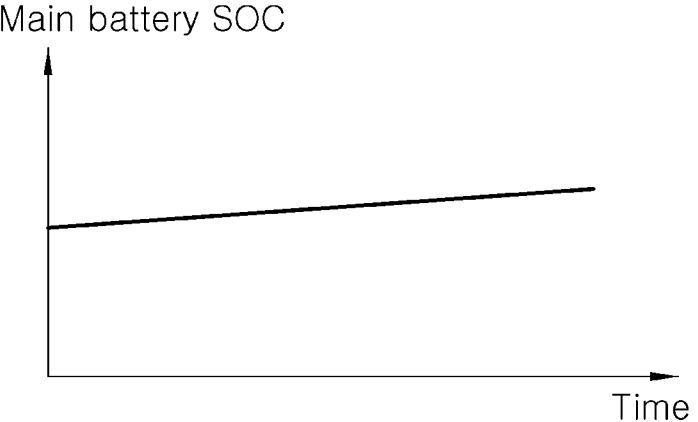

FIGS. 2 and 3 are graphs illustrating an example of the principle of limiting the output of the main battery. In each of the graphs illustrated in FIGS. 2 and 3, the vertical axis of an upper graph represents the power of the battery, and the vertical axis of a lower graph represents the SOC of the main battery 121. In addition, the horizontal axes of the upper and lower graphs represents time, and the horizontal axes of the upper and lower graphs are shared. That is, the same point of the horizontal axis in each graph may represent the same elapsed time. Accordingly, the result of integrating the battery power over time, that is, an area expressed in the upper graph of 2 is energy.

Referring to FIG. 2, assuming that the charge power of the swap battery 111 is maintained to be constant, when the main battery 121 is allowed to be discharged to a maximum discharge power higher than the charge power of the swap battery 111, a discharge energy of the main battery 121 in the reference period of time may be greater than the charge energy of the swap battery 111 in the reference period of time according to a driving situation. In this case, even if the main battery 121 is charged with the energy of the swap battery 111, the DOD is greater than the SOC, so as illustrated in the lower graph, the SOC of the main battery 121 decreases after the reference period of time.

In contrast, as illustrated in the upper graph of FIG. 3, when the maximum discharge power of the main battery 121 is decreased by difference between average discharge power and average charge power for the reference period of time (that is, when the maximum discharge power is limited), the SOC of the main battery 121 may increase as illustrated in the lower graph of FIG. 3, or at least, the SOC of the main battery 121 may be prevented from decreasing.

Hereinafter, based on the above-mentioned principle, a controller capable of performing the power management of the electric vehicle will be described with reference to FIG. 4.

Figure 4:
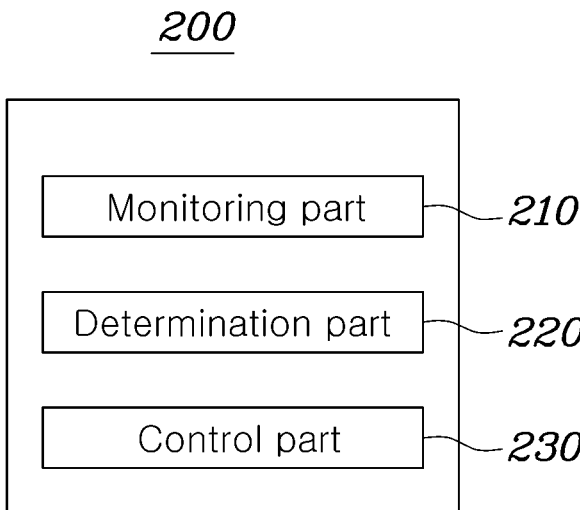
FIG. 4 is a block diagram illustrating an example of a charge/discharge management controller which performs the power management of the electric vehicle.

Meanwhile, FIG. 4 is a block diagram illustrating an example of the charge/discharge management controller which performs the power management of the electric vehicle. In some implementations, the electric vehicle of the present disclosure may further include the charge/discharge management controller 200 which performs the charging of the main battery 121 through the discharging of the swap battery 111, determines the charge and discharge powers of the main battery 121 during the charging of the main battery 121, and limits the maximum discharge power of the main battery 121 when the charge power is smaller than the discharge power. In addition, the charge/discharge management controller 200 may include a monitoring part 210, a determination part 220, and a control part 230.

Specifically, the monitoring part 210 may monitor maximum depth-of-discharge (DOD) information of the swap battery 111 or maximum SOC (state of charge) information of the main battery 121, the maximum SOC information being received from the swap battery 111. For example, the monitoring part 210 may monitor the maximum DOD information of the swap battery 111 through the second battery management system 112 connected with the swap battery 111. In some implementations, in the process of charging the main battery 121 through the swap battery 111, it may be conditioned that the main battery 121 is charged by discharging the swap battery 111 to the maximum. Accordingly, the swap battery 111 is discharged to the maximum, and the second battery management system 112 connected with the swap battery 111 collects the maximum DOD information of the swap battery 111, and the monitoring part 210 of the charge/discharge management controller 200 may monitor the maximum DOD information of the swap battery 111 by receiving the maximum DOD information from the second battery management system 112 of the swap battery 111. In this case, information monitored by the monitoring part 210 through the second battery management system 112 may be output power, an output current, or an output voltage output by the swap battery 111.

However, in a vehicle system, the DOD of the swap battery 111 may be used for driving the main battery 121 and auxiliary equipment (for example, the aforementioned cooling device) connected to the periphery of the swap battery 111. The monitoring part 210 may check the SOC charged in the main battery 121 through the maximum DOD of the swap battery 111, but as described above, when energy discharged from the swap battery 111 is not transferred only to the main battery 121, it may be accurate to directly check the SOC charged in the main battery 121. Accordingly, the monitoring part 210 may monitor the maximum SOC information received by the main battery 121 from the swap battery 111 through the first battery management system 122 connected with the main battery 121. In this case, the information monitored by the monitoring part 210 through the first battery management system 122 may be input power, an input current, and an input voltage which are input to the main battery 121.

Additionally, during the charging of the main battery 121, the determination part 220 may determine the charge power with which the main battery 121 is charged for the reference period of time, and the discharge power discharged from the main battery 121 for the reference period of time. Based on the information monitored by the monitoring part 210, the determination part 220 may determine the charge power with which the main battery 121 is charged for the reference period of time. In addition, in the present disclosure, the determination part 220 may determine the discharge power discharged from the main battery 121 while the vehicle is driving.

In addition, the control part 230 compares the charge power with the discharge power which are determined by the determination part 220, and may adjust the maximum discharge power of the main battery 121 according to the comparison result. The present disclosure is intended to prevent the decrease of the SOC of the main battery 121 when charging the main battery 121 through the swap battery 111 while the electric vehicle 100 is driving. Accordingly, the control part 230 compares the charge power with the discharge power which are determined by the determination part 220, and may determine whether to start a control for preventing the decrease of the SOC of the main battery 121 (that is, limiting the discharge power of the main battery 121) when charging the main battery 121. Even if the SOC of the main battery 121 is decreased due to the discharge thereof when the charge power is larger than the discharge power, the SOC charged through the swap battery 111 is high, so the SOC of the main battery 121 may not be decreased. However, when the discharge power is larger than the charge power, the SOC of the main battery 121 consumed through discharge thereof is high, so the SOC of the main battery 121 may not be increased through the swap battery 111 or may be decreased. Accordingly, the control part 230 compares the charge power with the discharge power, and may limit the maximum discharge power of the main battery 121 to prevent the decrease of the SOC of the main battery 121 when the discharge power is larger than the charge power.

In some implementations, the charge/discharge management controller 200 may function as a high rank controller which controls the entirety of a powertrain such as the vehicle control unit (VCU) 140 in the case of an electric vehicle, and a hybrid control unit (HCU) in the case of a hybrid vehicle. However, this is illustrative and not necessarily limited thereto. For example, the charge/discharge management controller 200 may be implemented as a controller separate from a high rank controller or may be implemented in such a manner that the functions of two or more different controllers are distributed.

Figure 5:
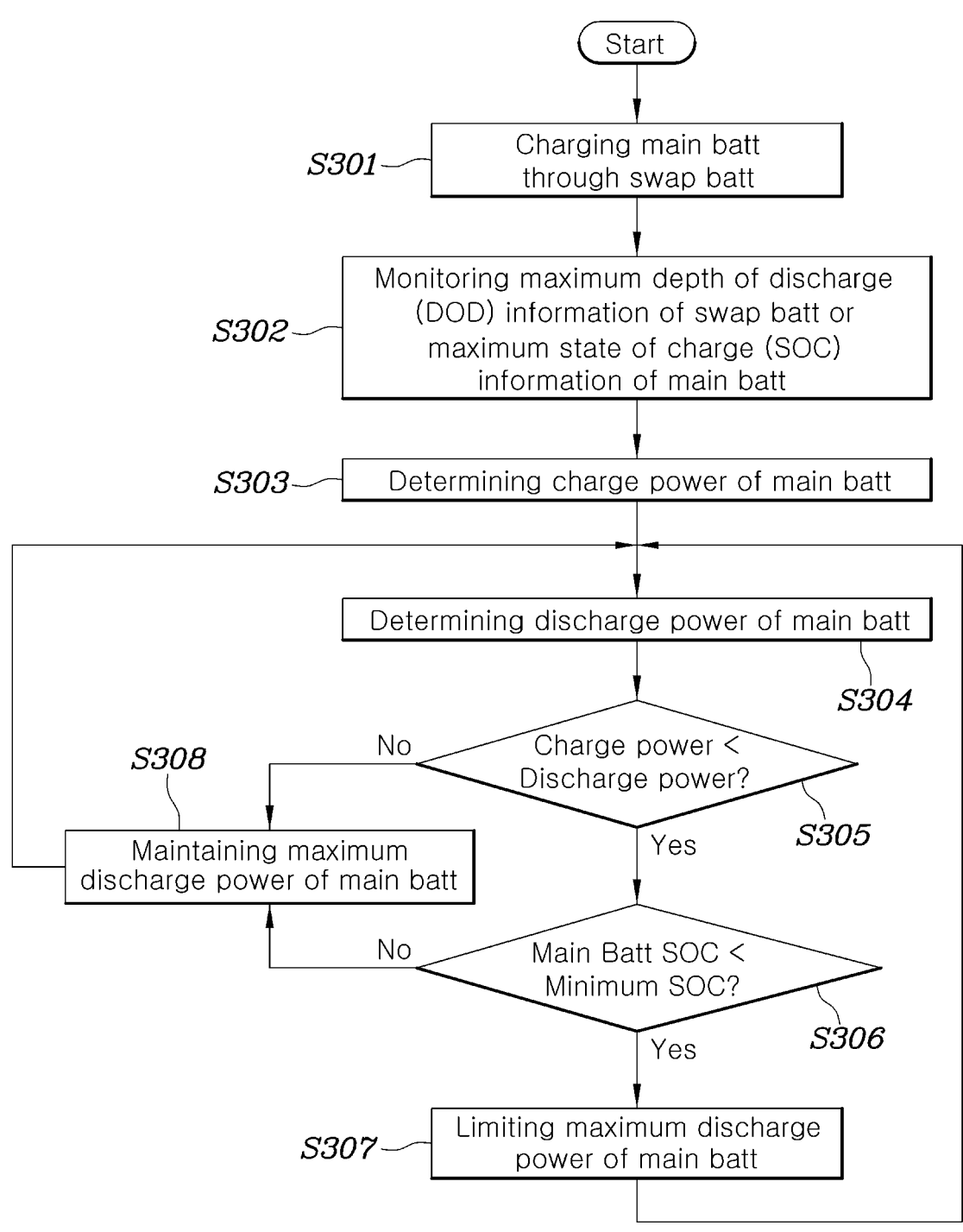
FIG. 5 is a flowchart of an exemplary power management method of the electric vehicle.

Hereinafter, based on the configuration of the electric vehicle 100 described in FIGS. 1 and 4, the exemplary power management method of the electric vehicle 100 will be described with reference to FIG. 5. In FIG. 5, it is assumed that the charge/discharge management controller 200 is implemented as the vehicle control unit 140 for convenience of explanation.

FIG. 5 is a flowchart of an example of the power management method of the electric vehicle.

Referring to FIG. 5, first, while the electric vehicle 100 is driving, the main battery 121 may be charged with the energy of the swap battery 111 at S301. A control logic to be described below may be performed in a situation in which the main battery 121 is charged with the energy of the swap battery 111. This may be performed in such a manner that a driver manipulates a device provided in a vehicle by checking the SOC of the main battery 121 or in such a manner that the first battery management system 122 transmits a signal for charging the main battery 121 to the vehicle control unit 140 by checking the SOC of the main battery 121. This is illustrative, and in addition to the above-mentioned methods, various methods of receiving the signal for charging the main battery 121 may be performed.

When the main battery 121 is charged with the energy of the swap battery 111, the vehicle control unit 140 may monitor the maximum DOD information of the swap battery 111 or the maximum SOC information of the main battery 121 at S302. When charging the main battery 121 through the swap battery 111, it is necessary to check the SOC charged in the main battery 121. Accordingly, for example, the vehicle control unit 140 may check the SOC charged in the main battery 121 by monitoring the maximum DOD information of the swap battery 111. In this case, the information monitored by the vehicle control unit 140 may include at least one of output power, an output current, and an output voltage output by the swap battery 111. This may mean that when the main battery 121 is charged through the swap battery 111, all energy discharged from the swap battery 111 is transferred to the main battery 121.

However, when a portion of the DOD of the swap battery 111 is required to be used for driving auxiliary equipment on the periphery of the swap battery 111 (for example, a cooling device including a cooling fan for the cooling control of the swap battery 111) due to a system configuration, the remaining DOD of the swap battery 111 except for the portion thereof necessary for driving the auxiliary equipment may be transferred to the main battery 121. Accordingly, for example, the vehicle control unit 140 may check the SOC charged in the main battery 121 by monitoring the maximum SOC information of the main battery 121. In this case, the information monitored by the vehicle control unit 140 may include at least one of input power, an input current, and an input voltage which are input to the main battery 121.

Next, the vehicle control unit 140 may determine the charge power charged in the main battery 121 at S303. The vehicle control unit 140 may determine the charge power charged in the main battery 121 by using the maximum DOD information of the swap battery 111 or the maximum SOC information of the main battery 121, which is monitored previously. For example, the vehicle control unit 140 integrates the charge energy with which the main battery 121 is charged for a reference period of time when charging the main battery 121, and may determine the average charge power obtained by dividing integrated charge energy by the reference period of time as the charge power.

Additionally, the vehicle control unit 140 may determine the discharge power discharged from the main battery 121 while the vehicle is driving at S304. In the present disclosure, a situation in which the main battery 121 is charged with the energy of the swap battery 111 occurs while the vehicle is driving, and it is necessary to determine the discharge power discharged from the main battery 121 while the vehicle is driving. Accordingly, for example, the vehicle control unit 140 may determine the average discharge power obtained by dividing integrated discharge energy by the reference period of time as the discharge power discharged from the main battery 121 after integrating the discharge energy of the main battery 121 for the reference period of time.

In this case, the vehicle control unit 140 may consider the rated power of the main battery 121 according to unit time when integrating the discharge energy of the main battery 121 for a reference period of time. Most electronic devices have rated power, and the rated power of the main battery 121 according to unit time may vary according to the type of the main battery 121 installed in the electric vehicle 100. For example, unit time may be one second, three seconds, five seconds or ten seconds, and the vehicle control unit 140 may determine the discharge power discharged during the discharging of the main battery 121 by using the rated power of the main battery 121 according to each unit time. This is illustrative, and in addition to the aforementioned unit time, there may be the rated power of the main battery 121 according to various periods of unit time.

Next, the vehicle control unit 140 may compare the charge power and the discharge power of the main battery 121 each other which are determined at S305. Additionally, the vehicle control unit 140 may decrease or limit the maximum discharge power of the main battery 121 by difference between the discharge power and the charge power when the charge power is smaller than the discharge power (Yes of S305) at S307. When the charge power charged in the main battery 121 is smaller than the discharge power discharged from the main battery 121 when charging the main battery 121 through the swap battery 111 while the vehicle is driving, it means that the SOC of the main battery 121 does not increase. Accordingly, when the charge power with which the main battery 121 is charged is smaller than the discharge power discharged from the main battery 121, the vehicle control unit 140 is required to limit the maximum discharge power of the main battery 121. The decrease of the SOC of the main battery 121 may be prevented by limiting the maximum discharge power of the main battery 121.

In addition, the vehicle control unit 140 compares the charge power with the discharge power, and may compare the current SOC and minimum state of charge (SOC) of the main battery 121 each other when the charge power is smaller than the discharge power (Yes of S305) at S306. In addition, the vehicle control unit 140 may consider the current SOC of the main battery 121 when limiting the discharge power of the main battery 121.

Specifically, the vehicle control unit 140 of the present disclosure checks the current SOC of the main battery 121 when the charge power is smaller than the discharge power, and may limit the maximum discharge power of the main battery 121 when the current SOC is smaller than the minimum SOC (Yes of S306) at S307. When the current SOC of the main battery 121 is smaller than the minimum SOC thereof, it is necessary to perform the charging of the main battery 121 in order to prevent the deterioration of the main battery 121 and maintain performance thereof, and the vehicle control unit 140 may control the charging of the main battery 121 through the charge power to be efficiently performed by limiting the maximum discharge power of the main battery 121.

Here, the minimum SOC of the main battery 121 may be a preset value, and the value may be preset in consideration of at least one of deterioration prevention of the main battery 121, battery performance for each SOC range, and satisfaction of a driver's power demand, but this is illustrative and not necessarily limited thereto.

In addition, through the presetting of the condition of the minimum SOC, even if the DOD is not limited in a situation in which the SOC of the main battery 121 is present to some extent, power performance required by a driver may be satisfied, and in a situation in SOC is decreased, it is possible to prevent the further decline of the SOC.

However, when the charge power is larger than the discharge power (No of S305), the vehicle control unit 140 may maintain the maximum discharge power of the main battery 121 at S308). The case in which the charge power is larger than the discharge power means that the SOC of the main battery 121 is not reduced due to the charging of the main battery 121 through the swap battery 111 even when the vehicle is driving. Accordingly, the vehicle control unit 140 may maintain the maximum discharge power of the main battery 121.

In addition, when the current SOC of the main battery 121 is larger than the minimum SOC (No of S306) even if the charge power is smaller than the discharge power, the vehicle control unit 140 may maintain the maximum discharge power of the main battery 121 at S308.

The present disclosure described above can be implemented as a computer-readable code on a medium in which a program is recorded. A computer-readable medium includes all kinds of recording devices in which data readable by a computer system is stored. Examples of computer-readable media include a hard disk drive (HDD), a solid state disk (SSD), a silicon disk drive (SDD), ROM, RAM, a CD-ROM, a magnetic tape, a floppy disk, and an optical data storage device, etc. Accordingly, the above detailed description should not be considered as restrictive in all respects, but rather as exemplary. The scope of the present disclosure should be determined by a reasonable interpretation of the appended claims, and all modifications within a scope equivalent to the scope of the present disclosure are included in the scope of the present disclosure.

What is claimed is:

1. A power management method of an electric vehicle, the method comprising:

performing charging of a main battery of the electric vehicle through discharging of a swap battery;

determining charge and discharge powers of the main battery during the performing the charging the main battery; and limiting, based on the determined charge power being less than the determined discharge power, a maximum discharge power of the main battery, wherein limiting the maximum discharge power of the main battery comprises decreasing, based on the determined charge power being less than the determined discharge power, the maximum discharge power of the main battery by a difference between the determined discharge power and the determined charge power.

2. The method of claim 1, wherein the performing the charging of the main battery comprises monitoring a maximum depth-of-discharge (DOD) information of the swap battery or a maximum state-of-charge (SOC) information of the main battery, the maximum SOC information being received from the swap battery.

3. The method of claim 2, wherein the maximum DOD or SOC information comprises (i) at least one of an output power, an output current, or an output voltage output by the swap battery or (ii) at least one of an input power, an input current, or an input voltage input to the main battery.

4. The method of claim 1, wherein determining the charge and discharge powers comprises determining, as the charge power, an average charge power obtained by dividing an integrated charge energy by a reference period of time, after integrating the charge energy charged in the main battery for the reference period of time during the performance of charging the main battery.

5. The method of claim 1, wherein determining the charge and discharge powers comprises determining, as the discharge power, an average discharge power obtained by dividing an integrated discharge energy by a reference period of time, after integrating the discharge energy of the main battery for the reference period of time.

6. The method of claim 5, wherein determining the average discharge power as the discharge power includes evaluating a rated power of the main battery according to unit time when integrating the discharge energy of the main battery.

7. The method of claim 1, wherein limiting the maximum discharge power of the main battery comprises decreasing, based on a current state of charge (SOC) of the main battery being less than a minimum SOC of the main battery, the maximum discharge power of the main battery by a difference between the determined discharge power and the determined charge power, after determining, based on the determined charge power being less than the determined discharge power, whether the current SOC of the main battery is less than the minimum SOC.

8. The method of claim 7, wherein limiting the maximum discharge power of the main battery further comprises maintaining, based on (i) the determined charge power being greater than the determined discharge power or (ii) the determined charge power being less than the determined discharge power and the current SOC of the main battery being greater than the minimum SOC, the maximum discharge power of the main battery.

9. An electric vehicle comprising:

a main battery and a swap battery; and a charge/discharge management controller configured to:

perform charging of the main battery through discharging of the swap battery, determine charge and discharge powers of the main battery during the performance of charging the main battery, and limit, based on the determined charge power being less than the determined discharge power, a maximum discharge power of the main battery, wherein the charge/discharge management controller is configured to, based on the determined charge power being less than the determined discharge power, decrease the maximum discharge power of the main battery by a difference between the determined discharge power and the determined charge power.

10. The electric vehicle of claim 9, wherein the charge/discharge management controller is configured to monitor a maximum depth-of-discharge (DOD) information of the swap battery or a maximum state-of-charge (SOC) information of the main battery, the maximum SOC information being received from the swap battery.

11. The electric vehicle of claim 10, wherein the maximum DOD or SOC information comprises (i) at least one of an output power, an output current, or an output voltage output by the swap battery or (ii) at least one of an input power, an input current, or an input voltage input to the main battery.

12. The electric vehicle of claim 9, wherein the charge/discharge management controller is configured to:

integrate a charge energy charged in the main battery for a reference period of time during the performance of charging the main battery, and determine, as the charge power, an average charge power obtained by dividing the integrated charge energy by the reference period of time.

13. The electric vehicle of claim 9, wherein the charge/discharge management controller is configured to:

integrate a discharge energy of the main battery for a reference period of time, and determine, as the discharge power, an average discharge power obtained by dividing the integrated discharge energy by the reference period of time.

14. The electric vehicle of claim 13, wherein the charge/discharge management controller is configured to:

evaluate a rated power of the main battery according to unit time when integrating the discharge energy of the main battery.

15. The electric vehicle of claim 9, wherein the charge/discharge management controller is configured to:

determine, based on the determined charge power being less than the determined discharge power, whether a current state of charge (SOC) of the main battery is less than a minimum state of charge (SOC) of the main battery, and decrease, based on the current SOC of the main battery being less than the minimum SOC of the main battery, the maximum discharge power of the main battery by a difference between the determined discharge power and the determined charge power.

16. The electric vehicle of claim 15, wherein the charge/discharge management controller is configured to, based on (i) the determined charge power being greater than the determined discharge power or (ii) the determined charge power being less than the determined discharge power and the current SOC of the main battery being greater than the minimum SOC, maintain the maximum discharge power of the main battery.

* * * * *